Patented Sept. 29, 1953

2,653,944

UNITED STATES PATENT OFFICE 2,653,944

PYRONONE DERIVATIVES AND PROCESS FOR THE MANUFACTURE THEREOF

Fritz Kögl, Utrecht, and Cornelis A. Salemink, Amersfoort, Netherlands, assignors to Hoffmann-La Roche Inc., Nutley, N. J., a corporation of New Jersey No Drawing. Application January 30, 1951, Serial No. 208,656. In Switzerland February 9, 1950

3 Claims. (Cl. 260—343.5)

1

The invention concerns pyran derivatives of the general formula

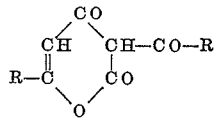

wherein R is an alkyl radical with 3 to 5 carbon atoms. It was discovered that such compounds possess good bacteriostatic activity and partly also excellent fermentation inhibiting properties, while being of low toxicity for warm-blooded animals; the representatives of the said class of substances are useful as preserving agents for fruit juices, preserves and other articles of food.

The novel compounds, according to the present invention, can be prepared by heating to 200–220° C. the homologues of the acetoacetic ester of the formula

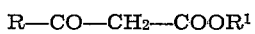

wherein R has the above indicated meaning and R' represents a lower alkyl radical, in the presence of a catalyst of basic reaction, especially sodium bicarbonate, and distilling off the alcohol formed during the reaction.

The reaction may be illustrated by the following formulae scheme:

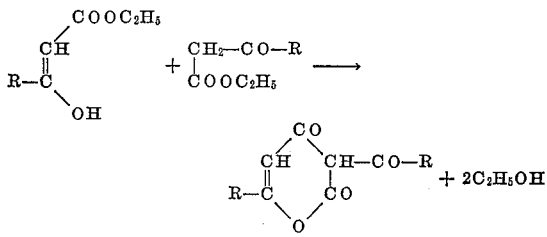

The following examples, in which the parts by weight and the parts by volume are in corresponding c. g. s. units, illustrate the manner in which the said novel compounds can be prepared:

Example 1

50 parts by weight of n-butyryl-ethyl acetate are heated for 7 hours to 200° C. with 0.05 part by weight of sodium bicarbonate, NaHCO₃. The alcohol split off by intramolecular condensation is distilled off during the heating process. The condensation product, 3-butyryl-6-propyl-2,3-dihydro-pyran-2,4-dione, is distilled in vacuo under a pressure of 0.08 mm. Hg and boils at 112–115° C. It represents a light-yellow oil solidifying in crystals upon prolonged storage. However, the crystals already melt at little above 20° C.

2

Relative bacteriostatic titer against pneumococci (50 per cent inhibition) 6,400.

Example 2

50 parts by weight of n-valeryl-ethyl acetate (see E. E. Blaise and A. Lüttringer, "Bulletin de la Société Chimique de France" III, volume 33, year 1905, page 1103) are heated for 4 hours to 210–215° C. with 0.05 part by weight of sodium bicarbonate, whereby 8 parts by volume of alcohol distil off. The condensation product, 3-valeryl-6-butyl-2,3-dihydro-pyran-2,4-dione, may be distilled under a pressure of 0.15 mm. Hg at 144–147° C. It can be recrystallized from alcohol and forms small plates of melting point 42° C. The yield amounts to 28 per cent of the theoretical, 30 parts by weight of n-valeryl-acetic ester being recovered as first running during the distillation process. Relative bacteriostatic titer against pneumococci (50 per cent inhibition) 256,000.

Example 3

50 parts by weight of n-capronyl-ethyl acetate (see G. W. Anderson, Journal of the American Chemical Society, volume 67, year 1945, page 2197) are heated for 5 hours to 215° C. with 0.05 part by weight of sodium bicarbonate, whereby 11 parts by volume of alcohol distil off. Distillation of the reaction product yields a fraction boiling over under a pressure of 0.12 mm. Hg at 165–167° C. and solidifying quickly. By crystallization from alcohol, small plates melting at 44° C. and consisting of pure 3-capronyl-6-pentyl-2,3-dihydro-pyran-2,4-dione are obtained. Relative bacteriostatic titer against pneumococci (50 per cent inhibition) 256,000.

Example 4

50 parts by weight of isobutyryl-acetic ester (see G. W. Anderson, J. F. Halverstadt, W. H. Miller, and R. O. Roblin, Jr., Journal of the American Chemical Society, volume 67, year 1945, page 2197) are heated for 7 hours to 200° C. with 0.05 part by weight of sodium bicarbonate. The alcohol formed during the intramolecular condensation is distilled off during the heating process. The condensation product, 3-isobutyryl-6-isopropyl-2,3-dihydropyran-2,4-dione, is distilled in vacuo under a pressure of 0.07 mm. Hg and boils over as a light-yellow oil at 97–101° C. Relative bacteriostatic titer against pneumococci (50 per cent inhibition) 12,800.

Example 5

50 parts by weight of isovaleryl-acetic ester (see R. Levine and C. R. Hauser, Journal of the American Chemical Society, volume 66, year 1944, page 1768) are heated for 5 hours to 210–215° C. with 0.05 part by weight of sodium bicarbonate. By fractionated distillation of the reaction mixture under a pressure of 0.23 mm. Hg, a first running of 10 parts by weight of isovaleryl-acetic ester and then a yellow oil of boiling point 123–124° C. consisting of 3-(β-methyl-butyryl)-6-isobutyl-2,3-dihydropyran-2,4-dione are obtained. Relative bacteriostatic titer against pneumococci (50 per cent inhibition) 102,400.

We claim:

1. A compound of the group consisting of 3-n-valeryl-6-butyl-2,3-dihydropyran-2,4-dione and 3-capronyl-6-pentyl-2,3-dihydropyran-2,4-dione.

2. As a new compound 3-n-valeryl-6-butyl-2,3-dihydropyran-2,4-dione.

3. As a new compound 3-capronyl-6-pentyl-2,3-dihydropyran-2,4-dione.

FRITZ KÖGL.

CORNELIS A. SALEMINK.

References Cited in the file of this patent

Arndt et al.: Berichte, vol. 69, pp. 2373–2380 (1936).

Elderfield: "Heterocyclic Compounds," vol. I, pp. 376–379 (1950).